United States Patent

Rohrbach

[11] Patent Number: 5,863,377
[45] Date of Patent: Jan. 26, 1999

[54] LAMINATE-FORMING APPARATUS

[75] Inventor: Walter Rohrbach, Burnsville, Minn.

[73] Assignee: Modular Concepts, Inc., Bloomington, Minn.

[21] Appl. No.: 822,824

[22] Filed: Mar. 24, 1997

Related U.S. Application Data

[63] Continuation of Ser. No. 418,550, Apr. 7, 1995, abandoned.

[51] Int. Cl.$^6$ ............................. B29C 53/04; B32B 3/04
[52] U.S. Cl. ..................... 156/358; 156/475; 156/479; 156/481; 156/498; 156/583.3; 156/583.91
[58] Field of Search ................................. 156/216, 475, 156/479, 481, 583.6, 583.7, 583.8, 583.91, 358, 498; 425/384, 402

[56] References Cited

U.S. PATENT DOCUMENTS

| | | | |
|---|---|---|---|
| 3,580,770 | 5/1971 | Dyal | 156/479 |
| 4,406,729 | 9/1983 | Elias | 156/475 |
| 4,539,065 | 9/1985 | Schmitt | 156/475 |
| 4,557,792 | 12/1985 | Yamada et al. | 156/583.91 |
| 4,784,712 | 11/1988 | Hoyle | 156/216 |
| 5,118,374 | 6/1992 | Suwitoadji | 156/475 |
| 5,456,783 | 10/1995 | Sissons | 156/470 |
| 5,474,633 | 12/1995 | Myers | 156/583.8 |

*Primary Examiner*—Richard Crispino
*Attorney, Agent, or Firm*—Nawrocki, Rooney & Sivertson, P.A.

[57] ABSTRACT

Apparatus for conforming laminate to a radius edge. The apparatus includes a heat bar assembly including a heat plate extending longitudinally along the radius edge. A mechanism is attached to the assembly for applying uniform pressure to the laminate longitudinally along the radius edge for uniform heating of the laminate. The mechanism may include a plurality of selectively controllable cylinders spaced longitudinally within the heat bar assembly for pre-stressing at least a portion of the heat plate relative to the heat bar assembly. Additionally, the heat bar assembly may further include a cooling plate, where the heat bar assembly is rotatable along its longitudinal axis between a cooling and a heating position.

6 Claims, 4 Drawing Sheets

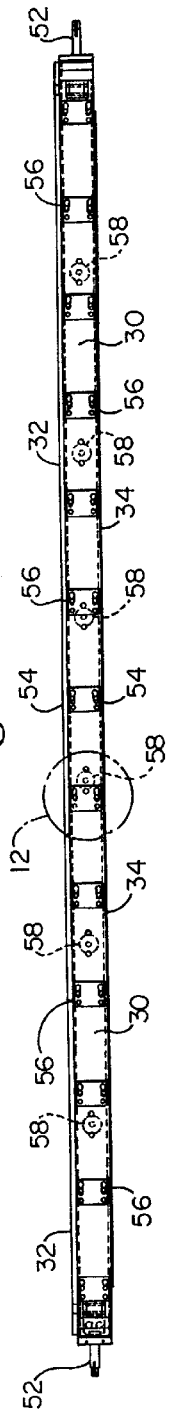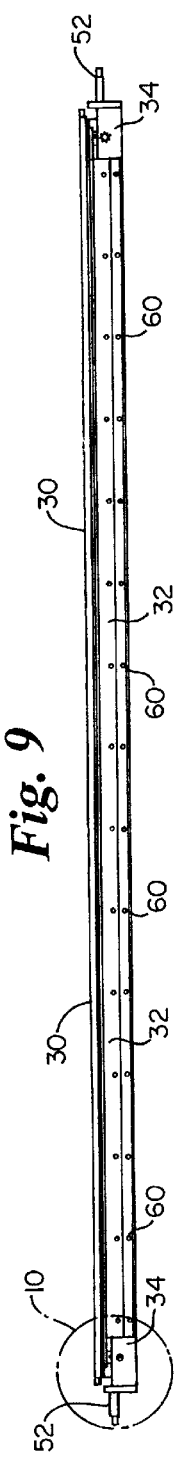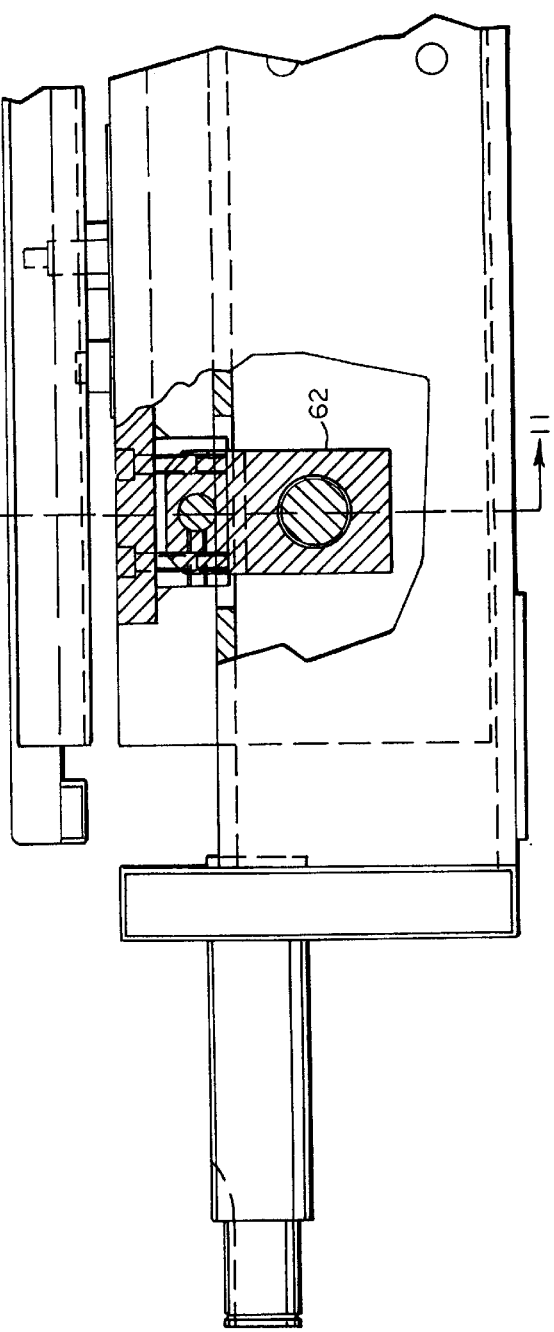

LAMINATE-FORMING APPARATUS

This is a file wrapper continuation of co-pending application Ser. No. 08/418,550 filed on Apr. 7, 1995.

FIELD OF THE INVENTION

The present invention relates to a laminate-forming apparatus. In particular, the present invention relates to a laminate-forming apparatus for postforming materials about a radius edge.

BACKGROUND OF THE INVENTION

Laminate surfaces are known for their economical cost and durable use. Common uses for laminate products include store fixtures, custom cabinets, desks or table tops, and kitchen countertops. Often, the laminated surfaces include a laminated radius edge.

Numerous methods exist for forming a laminate about a radius edge. In general, laminate is first applied to the surface of a core having a radius edge. The pre-applied laminate is secured to the core surface by any one of a number of methods as known in the art, such as by use of a contact adhesive. An adhesive layer on an under surface of the laminate secures the laminate to a similar layer on the surface of the core.

A portion of the laminate is left extending from a planar surface of the core to be secured to the radius edge. To secure the laminate to the radius edge, the laminated core is stabilized on a machine table. The laminate extending from the core may now be formed about the radius edge.

Present laminate-forming methods include the use of a longitudinally extending heat bar having a large pneumatic cylinder located at each end. In operation, the pneumatic cylinders move in a vertical direction to engage the heat bar with the laminate, heating the laminate to a temperature necessary for rendering the laminate sufficiently pliable to be bent around the radius edge. The heat bar is then removed. By pressing the laminate around the radius edge, the laminate is conformed to the edge to enable securement of the laminate to the radius edge.

The above methods of applying laminate to a radius edge fail to provide a uniform amount of heat longitudinally along the laminate to facilitate conforming the laminate to the radius edge. The heat bars, which often exceed ten feet in length, are supported by the pneumatic cylinders at the ends, and they can, as a result, bow in the middle.

In operation, when the heat bar presses the laminate against the radiused edge, heat is efficiently transferred to the laminate by conduction along the heat bar, which is located above the pneumatic cylinders. Since the heat bar tends to bow in the middle, air gaps can be created between the middle of the heat bar and the laminate, causing an inefficient transfer of radiant heat to the laminate surface. The non-uniform transfer of heat to the laminate surface along the radius edge can cause the laminate to be spaced from the core radiused edge at the center of the core due to the residual stress in the laminate.

In a similar method, relatively large pneumatic cylinders are located longitudinally beneath the heat bar. The heat bar contacts the laminate and is subsequently rotated about the radius edge to conform the laminate to the radiused edge. Holding adhesives such as Polyvinyl Acetate (PVA) can be used to secure the laminate to the core. The heat bar presses the laminate against the core until the PVA adhesive cures. Due to the size of the heat bar and pneumatic cylinders, this method of laminating particularly lends itself to the use of contact adhesives, such as a neoprene rubber adhesive, which require a method of cooling to set the adhesive for securing the laminate to the core.

SUMMARY OF THE INVENTION

The present invention relates to a laminate-forming apparatus. In particular, the present invention relates to a laminate-forming apparatus for postforming laminate materials about a radius edge.

In the preferred embodiment, the apparatus for conforming laminate about a radius edge comprises a heat bar assembly, including a heat bar extending longitudinally along the radius edge. Means are included as part of the assembly for applying uniform pressure to the laminate longitudinally along the radius edge.

The means for applying uniform pressure may include cylinder means spaced longitudinally along the heat bar. In the preferred embodiment, the cylinder means includes a plurality of pneumatic cylinders which may be selectively controlled. The cylinders can be located within the heat bar assembly.

The apparatus may include means for rolling the heat bar assembly about the radius edge. In the preferred embodiment, the means for rolling the heat bar assembly about the radius edge accomplishes tracking of the heat bar across the radius edge.

The heat bar assembly may further include means for cooling the heated laminate, which may include a cooling plate positioned proximate the heat bar. Additionally, the heat bar assembly may be selectively rotatable about a longitudinal axis of the heat bar assembly between a heating position and a cooling position.

In the preferred embodiment, the present invention includes a cylinder for use with a laminate-forming apparatus. The cylinder includes a chamber defined by a support member movably mounted to a core member. Means are included for pressure sealing the chamber. Means are included for communicating the chamber with an external pressure source for moving the support member relative to the core. Means may further be included for limiting the movement of the support member relative to the core. In one embodiment, the cylinder is located within the heat bar assembly. The cylinder is actuated by pressure and may be pneumatic or hydraulically actuated.

Yet another embodiment of the present invention includes a method of forming laminate about a radius edge. The method comprises the steps of: providing a core having pre-applied laminate extending tangentially from a radius edge; providing a heat bar assembly having a heat bar extending longitudinally along the radius edge; heating a surface of the heat bar; positioning the heat bar surface within a plane common with the laminate; and pressing the laminate against the radius edge with the heat bar to conform it to the edge.

The method may further include rolling the heat bar about the radius edge. The heat bar may be rolled about the radius edge through approximately 180°.

The method may further include locating at least one cylinder within the heat bar assembly for selectively bowing at least a portion of the heat bar relative to the heat bar assembly. The cylinder may be used to position the heat bar to define a plane. In the preferred embodiment, the cylinder is pneumatically controlled, and the cylinder is rolled along with the heat bar assembly.

The method may further include cooling the laminate. The laminate may be cooled by a cooling plate located on the heat bar assembly. In the preferred embodiment, cooling the laminate further comprises the steps of rotating the heat bar about a longitudinal axis of the heat bar; and rolling the cooling bar about the radius edge.

The novel laminate-forming apparatus of the present invention allows heat to be uniformly conducted to the laminate for conforming the laminate to the radius edge. The present invention allows for pre-stressing of the heat bar before or after heating, to compensate for bowing of the bar due to gravity forces and forming pressures. In the preferred embodiment, the heat bar is prestressed using a plurality of selectively controllable cylinders spaced longitudinally along the heat bar assembly to effect flexure of the heat bar to define a plane.

The pre-stressed heat bar provides generally uniform heat transfer and pressure along the laminate edge as the heat bar is rolled about the laminate radius edge to conform the laminate to the radius edge. The cylinders are low profile cylinders which are located within the heat bar assembly. The low profile cylinders allow for a cooling plate to be located on an adjacent side of the heat bar assembly, for subsequent cooling of the laminate after it is formed about the radius edge.

After heat forming the laminate about the radius edge, the heat bar assembly is rotated to a cooling position. In the cooling position, the cooling plate is rotated about the radius edge to cool the adhesive for bonding the laminate to the radius edge.

BRIEF DESCRIPTION OF THE DRAWINGS

FIG. 8 is a top plan view of the heat plate assembly in greatly reduced scale.

FIG. 9 is a front elevational view thereof.

FIG. 10 is a fragmentary front elevational view from the area encircled at 10 in FIG. 9 and enlarged therefrom, with parts cutaway.

DETAILED DESCRIPTION OF THE INVENTION

The present invention relates to a laminate-forming apparatus. In particular, the present invention relates to a laminate-forming apparatus for postforming materials about a radius edge.

The novel laminate-forming apparatus of the present invention allows heat to be uniformly conducted to a laminate to facilitate conformance of the laminate to a radius edge. The present invention allows for pre-stressing of the heat bar to compensate for bowing of the heat bar due to gravity and forming pressures. In the preferred embodiment, the heat bar is pre-stressed using a plurality of selectively controllable cylinders spaced longitudinally along the heat bar assembly to effect flexure of the heat bar to define a plane.

The pre-stressed heat bar provides generally uniform pressure against the laminate as the heat bar is rolled about the edge to conform the laminate to the radius edge. The cylinders are low profile cylinders which are located within the heat bar assembly. The low profile cylinders allow for a cooling plate to be located on an adjacent side of the heat bar assembly, for subsequent cooling of the laminate after it is conformed to the radius edge.

After heat forming the laminate about the radius edge, the heat bar assembly is rotated to a cooling position. In the cooling position, the cooling plate is rolled about the radius edge to cool the adhesive.

Figure 1:
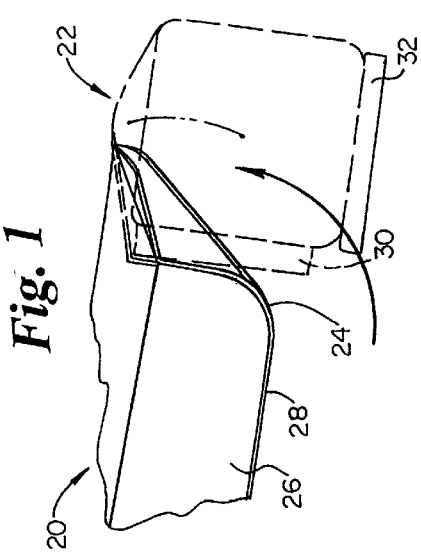
FIG. 1 is a perspective view illustrating the present laminate-forming apparatus invention.

FIG. 1 is a perspective view illustrating the laminate-forming apparatus of the present invention generally at 20. In general, a laminate-forming bar assembly 22 is rolled about the radius edge 24 of a core 26 to conform the laminate 28 to the radius edge 24. The laminate-forming bar assembly 22 extends longitudinally along the core 26 radius edge 24.

The laminate-forming bar assembly 22 includes a heat plate 30 for rendering the laminate 28 pliable and able to be bent about the radius edge 24. As the heat plate 30 is operated, it tends to bow in the middle due to gravity and forming pressures. If the heat plate 30 does not apply uniform pressure to the laminate 28 along the radius edge 24, heat is inefficiently transferred to the laminate. Heat is efficiently transferred to the laminate through conduction along the heat plate 30, but efficient transferral to the laminate 28 through radiant heat at the center of the heat plate 30 is diminished. The inefficient transfer of heat at the center causes the residual stress in the laminate 28 to space the laminate away from the core 26 radius edge 24.

The present invention provides means for compensating for the bowing of the heat plate 30, such that uniform contact and pressure may be applied to the laminate 28 along the full radius edge 24. Additionally, the present invention can provide for a cooling plate 32 to be rotated about the radius edge 24 to cool the adhesive which secures the laminate 28 to the radius edge 24.

Figure 2:
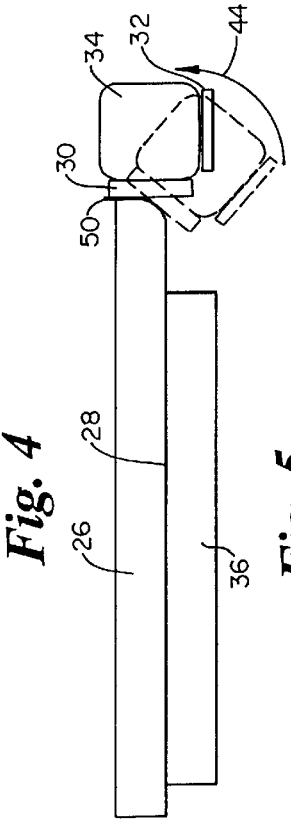
FIGS. 2–7 show the steps of conforming a laminate to a radius edge using the laminate forming apparatus of the present invention.

FIGS. 2–7 show the laminate-forming apparatus of the present invention in operation. FIG. 2 shows the laminate-forming bar assembly 22 located below the radius edge 24 prepared to contact the laminate 28. The laminate-forming bar assembly 22 includes heat plate 30 and cooling plate 32 secured to heat bar assembly support 34.

Core 26, having laminate 28 preapplied on one side of a planar portion, is held securely against a machine table 36. The core 26 may be held against machine table 36 by methods known in the art. In one embodiment, machine table 36 includes a vacuum system with adjustable seals (not shown) for retaining the core 26 against the machine table 36. The adjustable seals allow the vacuum system to be adjusted for retention of different sized cores. A portion of the laminate 28, indicated at 38, extends beyond the edge of core 26 in preparation for conforming the laminate extension 38 to the radius edge 24.

Laminate 28 is secured to the core 26 radius edge 24 by heating the laminate 28 and conforming it to the radius edge. The laminate 28 has preapplied adhesive on the laminate surface which contacts the radius edge 24. It is recognized that various types of adhesives may be used for securing the laminate 28 to the radius edge 24, while remaining within the scope of the present invention.

In one embodiment, the adhesive may be a polyvinyl acetate (PVA) adhesive. The laminate 28 is heated to conform the laminate 28 to the radius edge 24. The laminate is continually heated while pressure is applied to engage the laminate 28 against the radius edge 24 until the PVA adhesive effects securement.

In the preferred embodiment, the laminate 28 is secured to the radius edge 24 using a contact adhesive, such as a neoprene rubber adhesive. It is recognized that other contact adhesives may be used which include adhesives that are water or solvent based. The contact adhesive softens at a very high temperature, such as 300° F. The laminate 28 must then be held in place against the radius edge 24 to allow the contact adhesive to cool down and bond the laminate to the radius edge.

The process of forming a laminate about a radius edge in accordance with the present invention will now be described as shown in FIGS. 2–7. Referring again to FIG. 2, the laminate-forming bar assembly 22 heat plate 30 is positioned below the radius edge 24. The heat plate 30 is elevated to a temperature sufficient to heat the laminate 28 to make it pliable so that it will conform to the radius edge 24. In the process, the heat will soften the adhesive 40. In the preferred embodiment, the heat plate 30 is heated to a temperature greater than 300° F.

Figure 3:
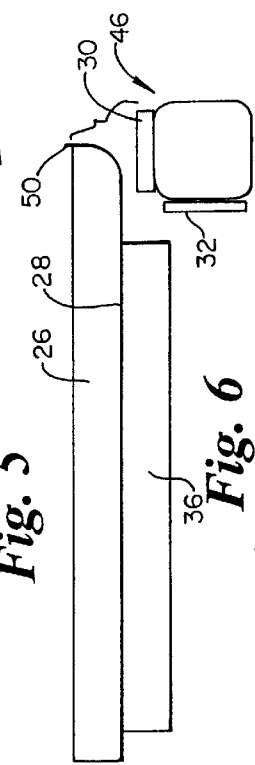

Referring to FIG. 3, the laminate-forming bar assembly 22 is moved in a direction indicated by directional arrow 42, engaging heat plate 30 with laminate 28. The laminate-forming bar assembly 22 is moved into contact position using a pneumatic cylinder (not shown) located at each end of the assembly 22. When the heat plate 30 engages the laminate 28, heat is transferred to the laminate 28 and, incidentally, the adhesive 40 by conduction. Since the core 26 is securely retained against the machine table 36, the laminate-forming bar assembly 22 and, specifically, heat plate 30 presses the laminate 28 against radius edge 24 along the entire edge of the core 26.

The heated surface of the heat plate 30 must make contact with the laminate 28 along the entire length for proper heating and forming of the laminate to occur. The heat plate 30, however, tends to bow at the middle. Cylinders (not shown in FIGS. 2–7) are located longitudinally within the laminate-forming bar assembly 22 to raise the middle of heat plate 30 relative to the support assembly 34 to compensate for such bowing. The heat plate 30 may now uniformly contact and apply uniform pressure against the laminate 28 surface along its full length. The novel method of applying uniform pressure to the laminate 28 by pre-stressing the heat plate 30 through the use of cylinders will be further described in detail later in the specification.

Figure 4:
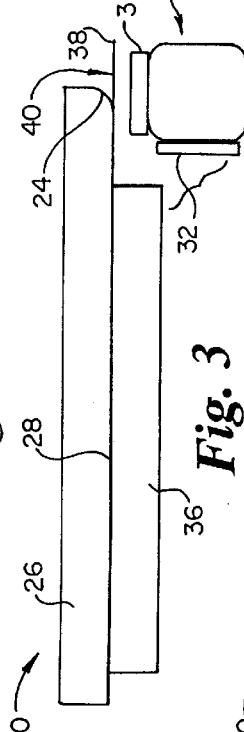

Referring to FIG. 4, after pressurized engagement of the heated laminate 28 against the core 26 is effected, the laminate-forming bar assembly 22 is rolled about the radius edge 24, indicated by directional arrow 44, to conform the laminate 28 to the radius edge 24.

Uniform pressure is applied along the entire edge of the core 26 as the heated heat plate 30 moves about the radius edge 24. The contact adhesive incidentally becomes heated to a high temperature softening the adhesive. The radius at which the laminate-forming bar assembly is rolled about the radius edge 24 can be adjustable to form fit each individual radius edge. The laminate-forming bar assembly 22 may be rolled about core 26 to conform the laminate 28 to a radius edge or curve which may vary between 0 and approximately 180°.

Figure 5:
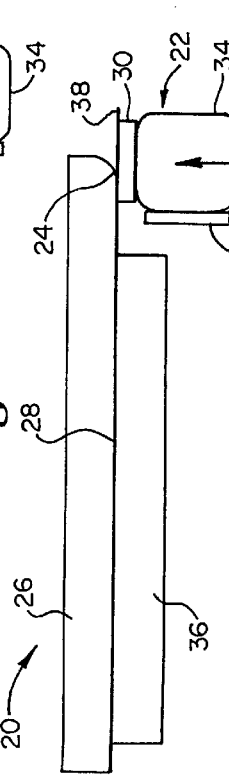

Referring to FIG. 5, after the heat plate 30 has heated laminate 28 and conformed the laminate 28 to radius edge 24, the laminate-forming bar assembly 22 is moved to a rest position away from the radius edge 24, indicated at 46. After heat processing, it is desirable to cool the adhesive to return it to its normal consistency. After heat-forming the laminate 28 to conform to the radius edge 24, residual stress in the laminate 28 may tend to make the laminate return toward its generally planar configuration. Therefore, it is desirable to cool the laminate and adhesive as quickly as possible to set the adhesive for the adhesive to bond the laminate 28 to the core 26 radius edge 24.

Figure 6:
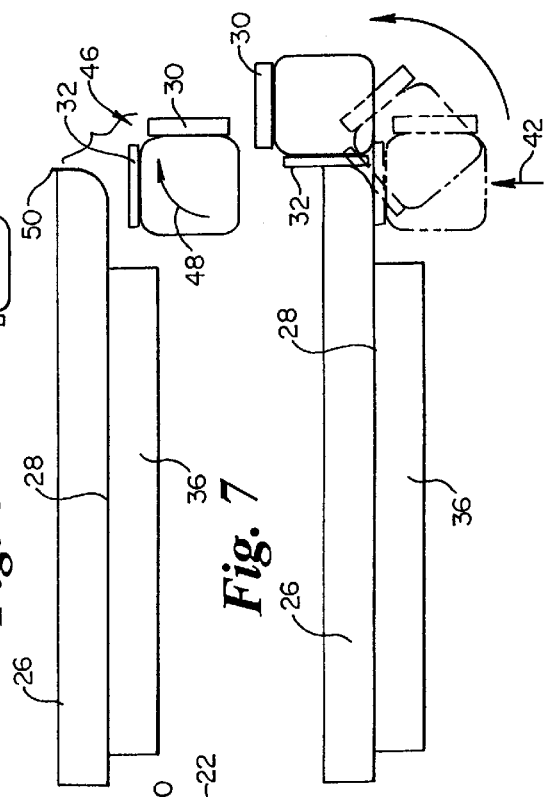

Referring to FIG. 6, a cooling plate 32 can be used as a heat sink to lower the temperature of the laminate 28 and the adhesive. The cooling plate 32 is located on an adjacent side of the laminate-forming bar assembly 22 heat bar assembly support 34. While in the rest position, indicated at 46, the laminate-forming bar assembly 22 is rotated about its longitudinal axis, indicated by rotational arrow 48, to locate cooling plate 32 directly opposite core 26. In the preferred embodiment, the laminate-forming bar assembly 22 is controllably rotated along its longitudinal axis using a hydraulic/pneumatic system.

Figure 7:
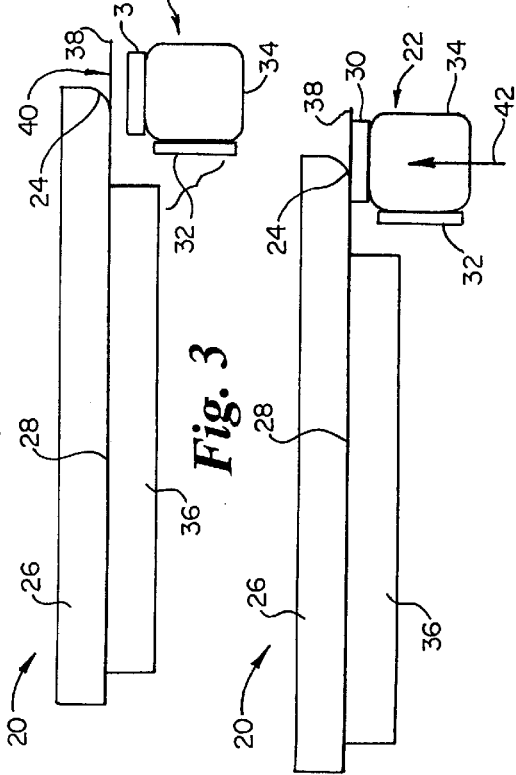

Referring to FIG. 7, the cooling plate 32 is brought in contact with the radius edge 24 as indicated by directional arrow 42. The cooling plate 32, in contact with laminate 28, is then rolled about the radius edge 24 in a manner similar to that in which heat plate 30 was rolled about radius edge 24. As the cooling plate 32 rolls about the radius edge 24, it acts as a heat sink drawing heat away from the heated laminate 28. The cooling plate 32 lowers the temperature of the laminate 28 surface and adhesive 40 to allow the adhesive 40 to bond the laminate 28 to the core 26.

After the above-described laminate-forming operation is complete, a portion of laminate salvage 50 may extend beyond the surface of the core 26. The laminate salvage 50 is removed to complete the laminate-forming process.

Referring to FIG. 8, a top plan view of the laminate-forming bar assembly 22 is shown, with a front elevational view of the laminate-forming bar assembly 22 shown in FIG. 9. Laminate-forming bar assembly 22 includes ends 52 for rotatably mounting the laminate-forming bar assembly within the laminate-forming apparatus 20. In one embodiment, the laminate-forming bar assembly 22 is approximately 14 feet in length.

Heat plate 30 will bow in the middle due to gravity and forming pressures. Heat plate 30 is fixedly mounted to heat bar assembly support 34 at the center, indicated at 54. Extending from the center of heat plate 30, heat plate 30 is longitudinally movably secured to heat bar assembly support 34 by bolt and slot mechanisms 56, which are shown in detail in FIG. 12. The bolt and slot mechanisms 56 allow for compensation for the expansion and contraction of heat plate 30 during heating and cooling of the heat plate 30.

Cylinders 58 are spaced longitudinally along the laminate-forming bar assembly 22 below heat plate 30 to compensate for bowing of heat plate 30 during the laminate-forming process. Before or after heating of heat plate 30, the cylinders 58 are operated to compensate for bowing in heat plate 30 and to apply uniform contact and pressure along heat plate 30 to the radius edge 24.

Referring to FIG. 9, in the preferred embodiment, cooling plate 32 is fixedly secured to heat bar assembly support 34 on a side adjacent the heat plate 30. The cooling plate 32 is secured to the heat bar assembly support 34 using any appropriate mechanism generally indicated at 60.

Figure 11:
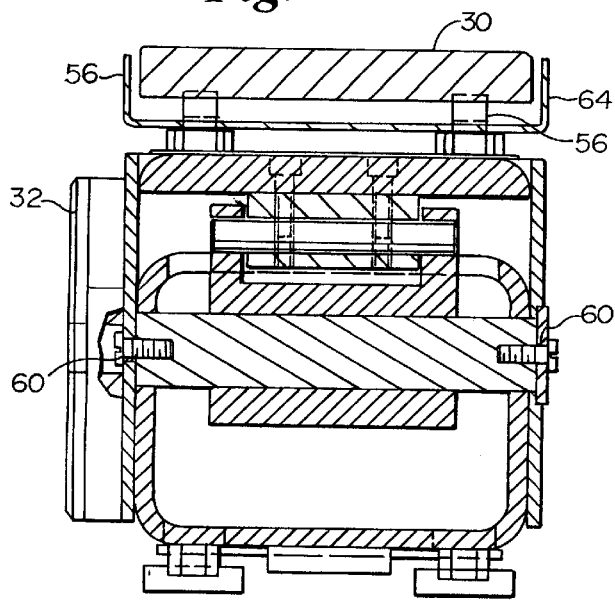
FIG. 11 is a section taken generally along line 11—11 in FIG. 10.

FIG. 10 is a fragmentary front elevational view of the laminate-forming bar assembly 22, with parts cutaway, taken from an area encircled at 10 in FIG. 9, showing mounting mechanism 62. FIG. 11 is a cross-sectional view of the laminate-forming bar assembly 22 taken along line 11—11 in FIG. 10. Mounting mechanism 62 compensates for linear variations in laminate-forming bar assembly 22 as it is rolled about the radius edge 24, and as it is rotated along its longitudinal axis between heating and cooling positions.

Referring to FIG. 11, heat plate 30 is shown secured to heat bar assembly support 34 using bolt and slot mechanisms 56. A heat shield 64 is located between heat plate 30 and heat bar assembly support 34 to shield, to some extent, the support assembly 34 from the heat plate 30 radiant and conductive heat. In the preferred embodiment, the heat shield 64 is formed of stainless steel.

In the preferred embodiment, the heat plate 30 is generally formed of an aluminum body having a silicone engagement surface. The silicone surface is bonded to the aluminum body.

The heat plate 30 is heated through a resistance heating mechanism which may include a ribbon or wire embedded in a silicone layer bonded to an opposite surface of the aluminum body. The silicone engagement surface provides for a near frictionless contact with the core 26 radius edge 24. In operation, preferably the laminate-forming bar assembly 22 heat plate 30 rolls around the radius edge 24 rather than sliding around the radius edge 24.

The cooling plate 32 is preferably formed of aluminum, with a layer of foam rubber bonded to the bottom surface and a layer of silicone rubber bonded to the top surface. During cooling of the laminate 28 applied to the radius edge 24, the silicone rubber surface engages the radius edge 24.

Figure 12:
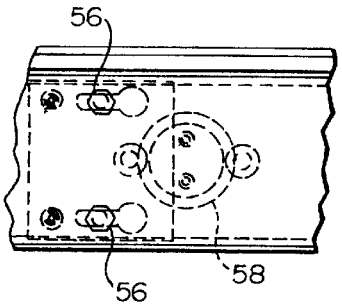
FIG. 12 is a fragmentary top plan view taken from the area encircled at 12 in FIG. 8 and enlarged therefrom.
Figure 13:
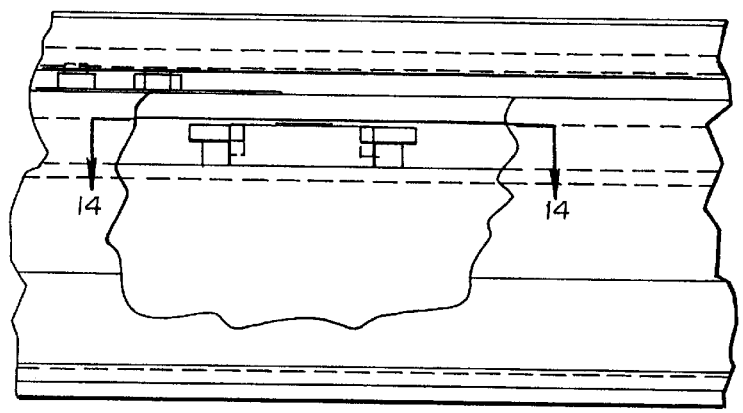
FIG. 13 is a fragmentary front elevational view of the subject of FIG. 12 and slightly enlarged therefrom with parts cutaway.
Figure 14:
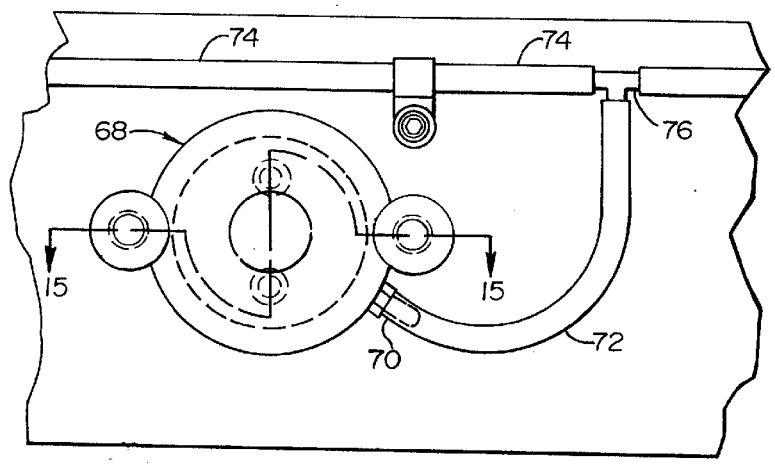
FIG. 14 is a fragmentary top plan sectional view taken generally along line 14—14 in FIG. 13.
Figure 15:
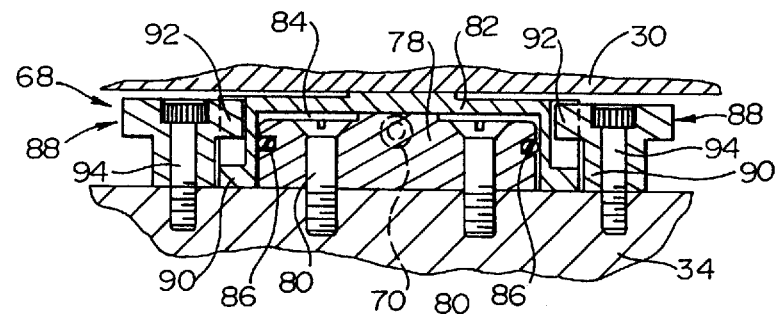
FIG. 15 is a section taken generally along line 15—15 in FIG. 14 and showing the piston in a home position.
Figure 16:
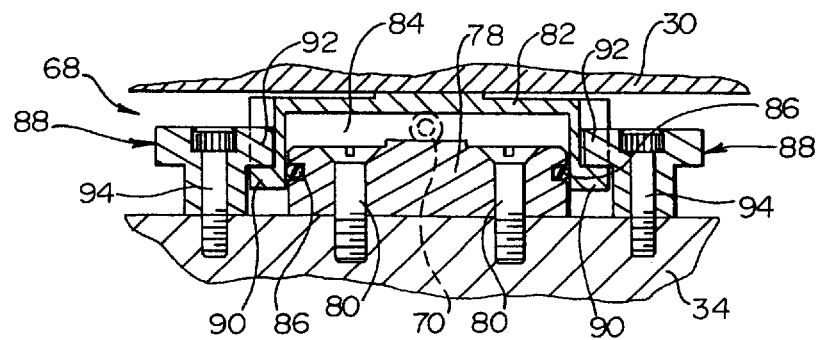
FIG. 16 is a view similar to that of FIG. 15 showing the piston in an advanced position.

FIGS. 8 and 12–16 show, in detail, cylinders 58 generally spaced longitudinally along the laminate-forming bar assembly 22. FIG. 13 is a fragmentary front elevational view of the subject of FIG. 12 with parts cutaway; FIG. 14 is a fragmentary plan sectional view taken along line 14—14 in FIG. 13 showing cylinder 58; FIG. 15 is a sectional view taken along line 15—15 in FIG. 14 showing the cylinder 58 piston 68 in a lowered position; and FIG. 16 is a sectional view similar to that of FIG. 15 showing the piston 68 in an advanced position.

Referring to FIGS. 12 and 13, one cylinder 58 (in FIG. 12) is shown located beneath heat plate 30 within laminate-forming bar assembly 22. In operation, by actuating cylinders 58, cylinders 58 compensate for any bowing in heat plate 30, allowing uniform pressure to be applied to laminate 28 as it is conformed to the radius edge 24. Since cylinders 58 are very low profile cylinders, it is easily located within the laminate-forming bar assembly 22. By locating cylinders 58 within the laminate-forming bar assembly 22, the laminate-forming bar assembly 22 may be rotated between a heating position and a cooling position without obstruction.

In the preferred embodiment shown in FIG. 14, each cylinder 58 is in the form of a pneumatically actuated piston 68. In the preferred embodiment, each pneumatically actuated piston 68 is connected at an inlet/outlet port to a pneumatic hose 72. The pneumatic hose 72 is connected to a main pneumatic line 74 at tee 76.

FIGS. 15 and 16 show the pneumatically actuated piston 68 of FIG. 14 in cross-sectional view. The piston 68 includes a core 78, core fasteners 80, support member 82, chamber 84, seal 86, and piston limiters 88. The core 78 is securely fastened to the heat bar assembly support 34 using core fasteners 80. The support member 82 is located above the core 78, and includes generally L-shaped ends 90. Located between the core 78 and support member 82 is chamber area 84. The support member 82 L-shaped ends 90 are positioned between the core 78 and piston limiters 80.

FIG. 15 shows piston 68 in a home position, and FIG. 16 shows piston 68 in an advanced position. In operation, before or after heat plate 30 is heated, piston 68 is actuated to compensate for bowing in heat plate 30. The position of piston 68 may be controlled by either manual or automatic control of the pneumatic system. In the preferred embodiment, inlet/outlet port 70 connects the chamber area 84 to the pneumatic system (not shown) through pneumatic hose 72 and main pneumatic line 74. As the pneumatic pressure is increased, chamber area 84 fills with air pressure which is sealed within the chamber area by means of seals 86. As the pneumatic pressure is increased, support member 82 is raised above core 78, which in turn raises heat plate 30 relative to heat bar assembly support 34.

The piston stroke may be advanced to a desired position, or to a maximum position which is determined by piston limiters 88. Piston limiters 88 generally include a retainer head 92 secured to the heat bar assembly support 34 by retainers 94. As the support member 82 travels upward as a result of increasing hydraulic pressure, the support member 82 will continue to raise heat plate 30 until the L-shaped ends 90 contact the retainer head 92 of piston limiters 88. The unique design of pistons 68 allows them to be located within laminate-forming bar assembly 22 without interfering with the operation of rotating the laminate-forming bar assembly 22 between a heating position and a cooling position. Although, in the preferred embodiment, the piston 68 is pneumatically actuated, it is recognized that the piston 68 may be actuated by other means, such as through connection to a hydraulic system.

It is recognized that the pressure to cylinders 58 may be controlled using different methods while remaining within the scope of the present invention. In the preferred embodiment as shown in FIGS. 8 and 14, the cylinders 58 are daisy-chained to a common main pneumatic line 74 providing equal pressure to each cylinder and in turn equal compensation to each area of heat plate 30.

Since the heat plate 30 bows the most in the middle, it is recognized that it may be desirable to control the pressure to the cylinders individually or in groups to compensate for the different amount of bowing at each location. In one alternative embodiment, a separately controllable pressure regulator is located on each hydraulic hose 72 leading to each cylinder 58 for individual control of the pneumatic pressure to each cylinder 58. In yet another embodiment, the cylinders are controlled in pairs with each pair having a common regulator. The cylinders located on a common pressure regulator would be the cylinders which are the same distance from the center of the heat plate 30.

It is recognized that the present laminate-forming apparatus may be manually or automatically controlled. If automatically controlled, it may be controlled by a microprocessor based control system, or similar logic based system using, for example, logic gates, a computer, programmable logic controllers, or a similar system. Additionally, the present system is fully adjustable, including the heating time and cooling time for conforming the laminate to the radius edge, and the control of pressure to the cylinders for pre-stressing the heat plate to compensate for bowing.

The novel laminate-forming apparatus of the present invention allows heat to be uniformly conducted to a laminate to be conformed to a radius edge. The present invention allows for pre-stressing of the heat bar before or after heating to compensate for bowing of the heat bar due to gravity and forming pressures. In the preferred embodiment, the heat bar is pre-stressed using a plurality of selectively controllable cylinders spaced longitudinally along the heat bar assembly to flex the heat bar relative to the assembly to define a plane.

The pre-stressed heat bar provides uniform pressure against the laminate as the heat bar is rolled about the radius edge to conform the laminate to the radius edge. The cylinders are low profile cylinders which are located within the heat bar assembly. The low profile cylinders allow for a cooling plate to be located on an adjacent side of the heat bar assembly, for subsequent cooling of the laminate after it is conformed to the radius edge.

After heat forming the laminate about the radius edge, the heat bar assembly is rotated to a cooling position. In the cooling position, the cooling plate is rotated about the radius edge to cool the adhesive for bonding the laminate to the radius edge.

It will be understood that this disclosure, in many respects, is only illustrative. Changes may be made in details, particularly in matters of shape, size, material, and arrangement of parts without exceeding the scope of the invention. Accordingly, the scope of the invention is as defined in the language of the appended claims.

What is claimed is:

1. Apparatus for conforming a laminate to a radius edge of a core, comprising:

(a) a laminate forming bar assembly, supported only at opposite ends thereof, extending longitudinally along an axis substantially parallel to an axis about which the radius edge is defined;

(b) said assembly including a heat plate engagable with the laminate while the laminate is closely proximate the radius edge for heating the laminate, said heat plate having a length and extending longitudinally along said laminate forming bar assembly;

(c) means, internally mounted within said laminate forming bar assembly, for compensating for bowing of the heat plate in order to apply substantially uniform pressure to the laminate, when the heat plate is in engagement with the laminate; and (d) means for rolling the laminate forming bar assembly about the radius edge.

2. The apparatus of claim 1, wherein said means for compensating includes a plurality of cylinders spaced longitudinally along the heating plate.

3. The apparatus of claim 2, wherein the laminate forming bar assembly further includes means for cooling the laminate after it has been heated and conformed to the radius edge.

4. The apparatus of claim 3, wherein said cooling means comprises a cooling plate.

5. The apparatus of claim 4, wherein said cooling plate is located proximate said heating plate.

6. The apparatus of claim 2, further comprising means for selectively controlling operation of said cylinders.

* * * * *